United States Patent
Rivera et al.

(10) Patent No.: US 10,720,747 B2
(45) Date of Patent: Jul. 21, 2020

(54) MICRO-REFRACTIVE ELEMENT STABILIZED RESONATORS, LASERS AND MULTIPLE BEAM LASING

(71) Applicant: The Board of Trustees of the University of Illinois, Urbana, IL (US)

(72) Inventors: Jose A. Rivera, Savoy, IL (US); Tom Galvin, Champaign, IL (US); J. Gary Eden, Champaign, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 0 days.

(21) Appl. No.: 15/778,535

(22) PCT Filed: Nov. 21, 2016

(86) PCT No.: PCT/US2016/063116
§ 371 (c)(1),
(2) Date: May 23, 2018

(87) PCT Pub. No.: WO2017/091508
PCT Pub. Date: Jun. 1, 2017

(65) Prior Publication Data
US 2019/0252843 A1    Aug. 15, 2019

Related U.S. Application Data

(60) Provisional application No. 62/259,451, filed on Nov. 24, 2015.

(51) Int. Cl.
*H01S 3/086*    (2006.01)
*H01S 3/08*    (2006.01)
(Continued)

(52) U.S. Cl.
CPC .......... *H01S 3/086* (2013.01); *G01B 9/02007* (2013.01); *G01B 9/02019* (2013.01);
(Continued)

(58) Field of Classification Search
CPC .... H01S 3/086; H01S 3/0804; H01S 3/08059; H01S 3/139; H01S 3/091; H01S 3/108; H01S 3/13; H01S 3/1603
See application file for complete search history.

(56) References Cited

U.S. PATENT DOCUMENTS

| 4,803,688 A | 2/1989 | Lawandy |
| 4,986,635 A | 1/1991 | Spry |

(Continued)

FOREIGN PATENT DOCUMENTS

| WO | 2008152367 A1 | 12/2008 |
| WO | 20170091508 | 6/2017 |

OTHER PUBLICATIONS

Fleck et al., "Convective assembly of a particle monolayer", Langmuir, vol. 31, No. 51, pp. 13655-13663, 2015.
(Continued)

*Primary Examiner* — Armando Rodriguez
(74) *Attorney, Agent, or Firm* — Greer, Burns & Crain; Steven P. Fallon

(57) ABSTRACT

A resonator is provided that includes opposing mirrors arranged substantially parallel to each other and separated to confine reflections for gain. A gain medium is between the opposing mirrors. A pump pumps the gain medium. At least one microrefractive element, or tens, hundreds, thousands, millions or more, stabilizes the resonator. The refractive element is disposed between the opposing mirrors and is configured to support a laser beam at a position of the refractive element. A method for producing laser light directs pump light onto one or a plurality of microrefractive elements. Reflections from the one or a plurality of microrefractive elements are confined in a resonator volume. Gain is provided in the resonator volume. Laser energy is emitted from the resonator volume.

29 Claims, 20 Drawing Sheets

(51) Int. Cl.
*G02F 1/035* (2006.01)
*G01B 9/02* (2006.01)
*H01S 3/139* (2006.01)
*H01S 3/22* (2006.01)
*H01S 3/213* (2006.01)
*H01S 3/06* (2006.01)
*G02B 21/00* (2006.01)

(52) U.S. Cl.
CPC ..... *G01B 9/02028* (2013.01); *G01B 9/02041* (2013.01); *G01B 9/02082* (2013.01); *G02F 1/035* (2013.01); *H01S 3/08* (2013.01); *H01S 3/0804* (2013.01); *H01S 3/08059* (2013.01); *H01S 3/139* (2013.01); *G02B 21/0032* (2013.01); *H01S 3/0604* (2013.01); *H01S 3/08018* (2013.01); *H01S 3/213* (2013.01); *H01S 3/22* (2013.01)

(56) References Cited

U.S. PATENT DOCUMENTS

| | | | |
|---|---|---|---|
| 5,028,802 | A | 7/1991 | Webb |
| 5,265,116 | A * | 11/1993 | Mooradian ........... H01S 3/0627 372/21 |
| 6,134,009 | A | 10/2000 | Zavislan |
| 7,030,383 | B2 | 4/2006 | Babayoff et al. |
| 7,339,148 | B2 | 3/2008 | Kawano et al. |
| 7,630,416 | B2 | 12/2009 | Hong |
| 2011/0149285 | A1 | 6/2011 | Chen et al. |
| 2013/0121363 | A1 | 5/2013 | Goldberg |
| 2015/0064447 | A1 | 3/2015 | Dewa et al. |

OTHER PUBLICATIONS

Giesen et al., "Scalable Concept for Diode-Pumped High-Power Solid-State Lasers", Applied Physics B, vol. 58, pp. 365-372, 1994.

Humar, M.; Gather, M. C.; Yun, S.-H. Cellular Dye Lasers: Lasing Thresholds and Sensing in a Planar Resonator. Opt. Express 2015, 23 (21), 27865.

Gather, M. C.; Yun, S.-H. Single-Cell Biological Lasers. Nat. Photonics 2011, 5 (July), 3-7.

Gourley, P. L.; Gourley, M. F. Biocavity Lasers for Biomedicine. Trends Biotechnol. 2000, 18 (11), 443-448.

Huignard et al., "Speckle-free imaging in four-wave mixing experiments with Bi12SiO20 crystals", Opt. Letters, vol. 5, p. 436, 1980.

Redding et al., "Low spatial coherence electrically pumped semiconductor laser for speckle-free full-field imaging", PNAS, vol. 112, No. 5, pp. 1304-1309, Feb. 3, 2015.

Kohler et al., "Speckle reduction in pulsed-laser photographs", Opt. Commun., vol. 12, No. 24, 1974.

Redding et al., "Speckle-free laser imaging using random laser illumination", Nature Photonics, vol. 6, pp. 355-359, Apr. 29, 2012.

Voelkel et al., "Laser beam homogenizing: limitations and constraints", Proc. SPIE 7102, 71020J-1, 2008.

Shane Thomas, International Search Report for Application No. PCT/US2016/063116, dated Feb. 16, 2017.

* cited by examiner

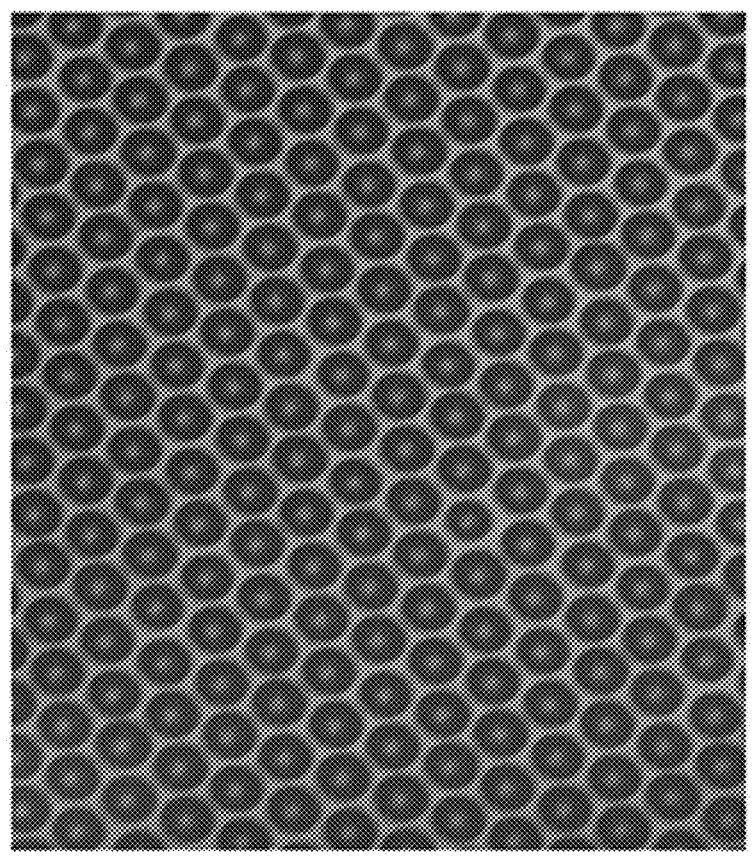
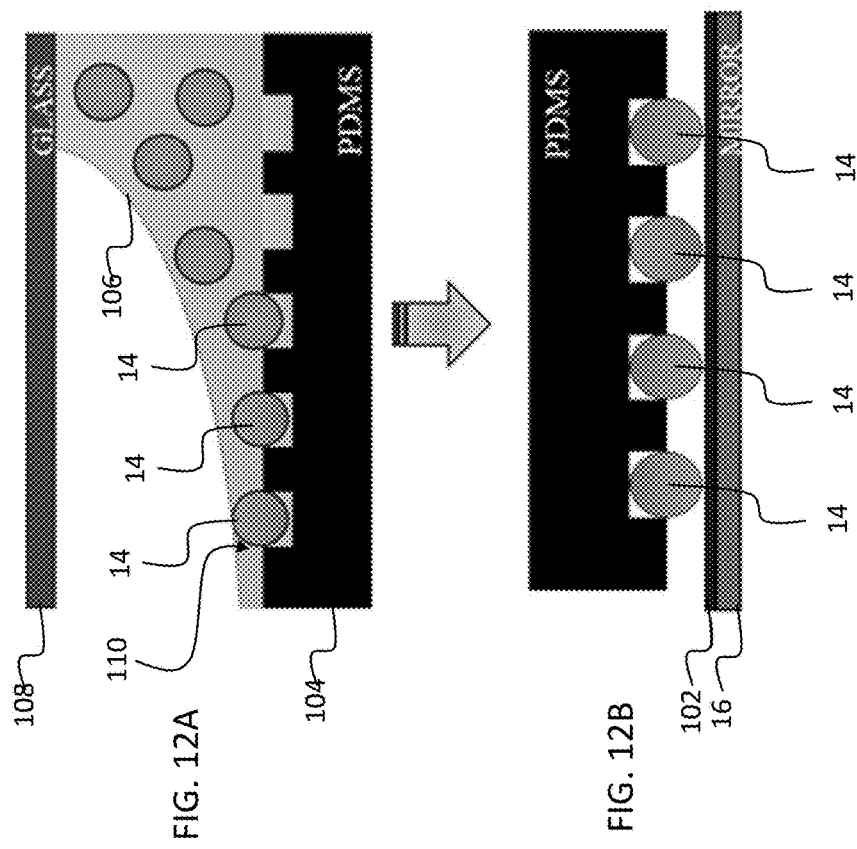
FIG. 12C
FIG. 12A
FIG. 12B

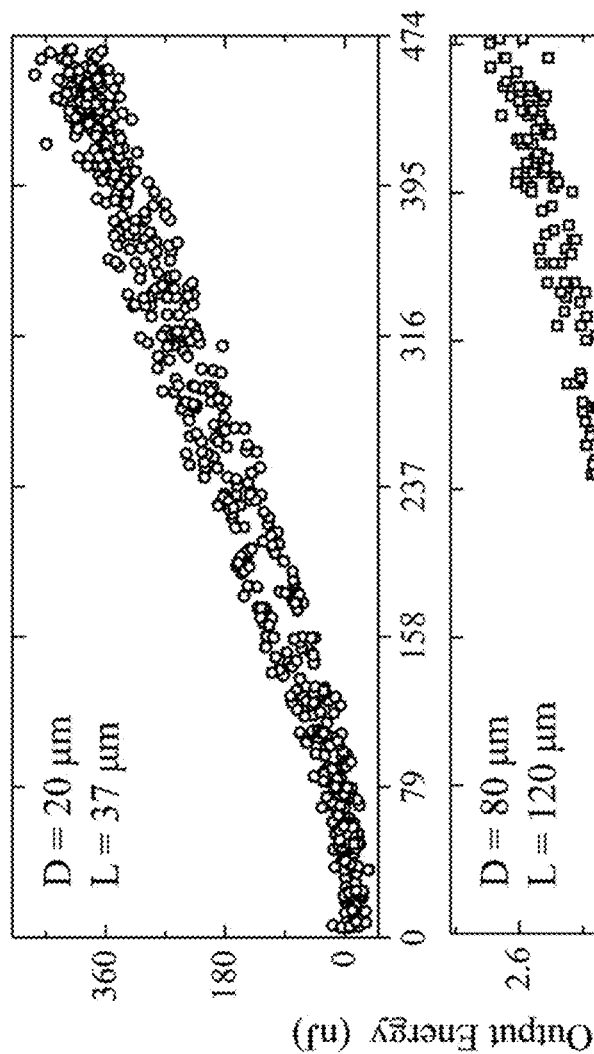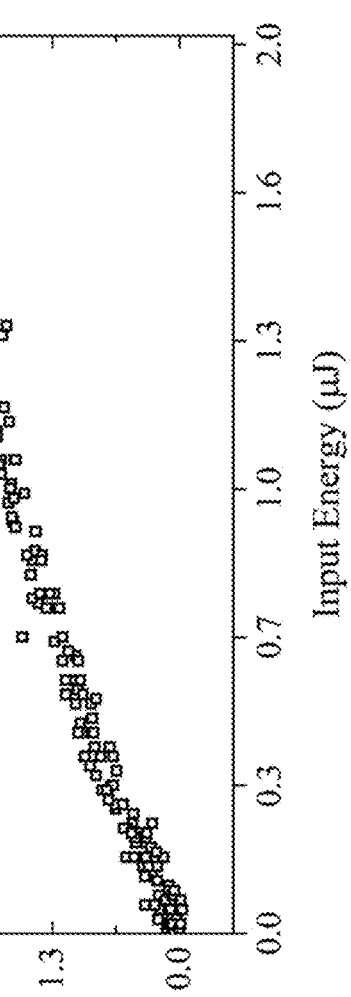
FIG. 14A
FIG. 14B

MICRO-REFRACTIVE ELEMENT STABILIZED RESONATORS, LASERS AND MULTIPLE BEAM LASING

PRIORITY CLAIM AND REFERENCE TO RELATED APPLICATION

The application claims priority under 35 U.S.C. § 119 and all applicable statutes and treaties from prior U.S. provisional application Ser. No. 62/259,451, which was filed Nov. 24, 2015.

STATEMENT OF GOVERNMENT INTEREST

This invention was made with government support under grant number FA9550-14-1-0002 awarded by Air Force Office of Scientific Research. The government has certain rights in the invention.

FIELD

Fields of the invention include optical resonators and lasers. Example applications of the invention include laser devices capable of generating thousands or millions of laser beams from an optical resonator of modest dimensions. Example applications of the invention are high power lasers, laser interferometers, and imaging systems, such as biological imaging systems.

BACKGROUND

Optical resonators for lasers generally consist of two mirrors, separated by a distance and facing each other. A gain medium between the mirrors amplifies light confined by the mirrors, and resonant frequencies are amplified during feedback to produce laser light. An important resonator design is the Fabry-Perot or parallel-plane cavity resonator, which consists of two planar mirrors. These resonators are used in lasers for many applications for favorable optical properties, including large free spectral range and high finesse. However, the planar mirror Fabry-Perot resonators suffer from the drawback of being "critically stable". Slight misalignments of the two planar mirrors (i.e., are not absolutely parallel) cause the cavity to become unstable. This makes lasing difficult, if at all possible. Fabry-Perot resonators, therefore, have little to no manufacturing tolerance. Furthermore, heating of a laser gain medium will adversely impact beam quality. Thermal gradients, arising from heat dissipation in high-power lasers, cause refractive index variations in the gain medium which result in the degradation of beam quality when a single beam is produced.

SUMMARY OF THE INVENTION

An embodiment of the invention is a resonator stabilized by microrefractive elements. A preferred resonator includes opposing mirrors arranged substantially parallel to each other and separated to confine reflections for gain. A gain medium is between the opposing mirrors. A pump pumps the gain medium. At least one microrefractive element, or tens, hundreds, thousands, millions or more, stabilizes the resonator. The refractive element is disposed between the opposing mirrors and is configured to support a laser beam at a position of the refractive element.

A method for producing laser light directs pump light onto one or a plurality of microrefractive elements. Reflections from the one or a plurality of microrefractive elements are confined in a resonator volume. Gain is provided in the resonator volume. Laser energy is emitted from the resonator volume.

Resonators and methods of the invention tolerate misalignment from the perfect parallel requirement of the conventional planar mirror Fabry-Perot resonators. Lasing occurs at locations of the microrefractive elements. Preferred elements include microspheres and organisms that refract light. Lasers of the invention can provide high power from hundreds, thousands or millions of high quality factor beams.

BRIEF DESCRIPTION OF THE DRAWINGS

FIG. 5A with a polystyrene sphere having a diameter of 75 µm; FIG. 5B: transverse modes for 80 µm sphere.

FIGS. 12A-12B illustrate a preferred fabrication process for a resonator and laser of the invention and FIG. 12C is an image of an array of micro spheres in a hexagonal pattern formed on a resonator mirror in accordance with the method of FIGS. 12A-12B;

FIGS. 14A and 14B include measured data for the lasing threshold for microspheres having diameters of 80 µm and 20 µm, respectively, in a preferred embodiment;

DETAILED DESCRIPTION OF THE PREFERRED EMBODIMENTS

Figure 1A:
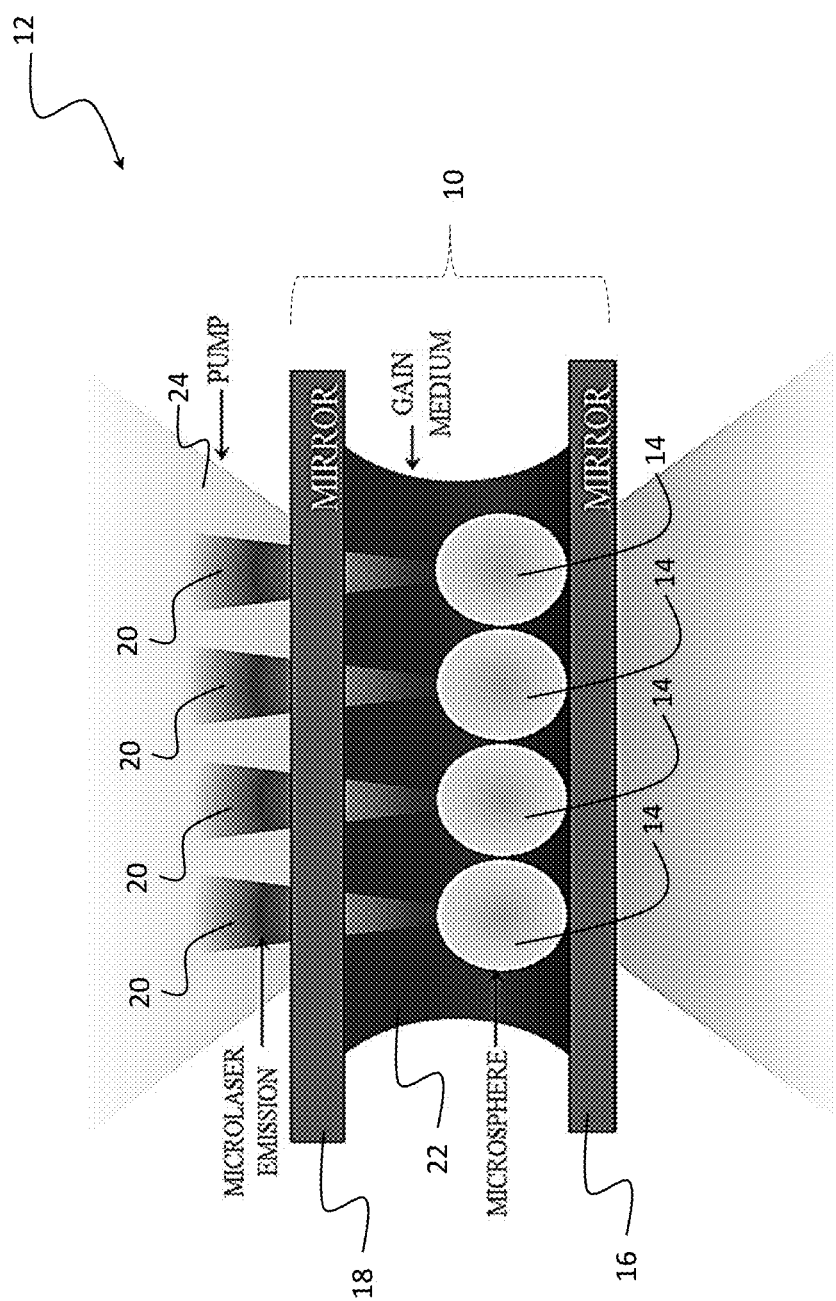
FIG. 1A is a schematic diagram (in cross-section) of preferred embodiment resonator and laser of the invention with a liquid or gas gain medium.

An embodiment of the invention is an optical resonator stabilized with a microrefractive element. The resonator includes planar or substantially planar mirrors. The resonator is stabilized with microrefractive elements that act as lenses to locally stabilize portions of the cavity at the position of at least one of the refractive elements. In preferred embodiments, the microrefractive elements are only on one side, such as on one mirror, of the cavity. If microrefractive elements are on both sides, such as on both mirrors, of the cavity, then the microrefractive elements need to be aligned opposite each other. In preferred embodiments, substantially planar mirrors tolerate a misalignment from the perfect parallel requirement of the conventional planar mirror Fabry-Perot resonators discussed in the background, but are stabilized by the microrefractive elements. In preferred embodiments, the microrefractive elements are microspheres. In other embodiments, a biological cell or a sheet of molded glass hemispheres are used as microrefractive elements.

Resonators of preferred embodiments can produce stable beams with lasing occurring at positions of the microrefractive elements. The number of beams can be tens, hundreds, thousands or more, with each beam corresponding to the position of a microrefractive element, which can be arranged in a manner corresponding to pixels of a display.

Embodiments of the invention include a new family of optical resonators that, instead of producing a single laser beam as is normally the case with a conventional two-mirror resonator, are capable of producing hundreds of thousands or millions of laser beams from a resonator of the same size. Each laser beam can be of high optical quality, having a transverse intensity profile of the lowest order mode. In other embodiments, multiple higher order transverse modes are generated. The present resonators can be configured to generate laser beams whose properties can be controlled with precision. A system of the invention can assemble these beams outside the laser into one or more beams of higher power. Preferred systems assemble a single (or a few) laser beams from hundreds to thousands of smaller beams for which the optical quality (mode pattern, phase relative to other beams, etc.) can be controlled with exquisite precision.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

FIG. 1A is a schematic diagram illustrating a preferred resonator 10 and laser 12 of the invention. One or more microrefractive elements 14, e.g., microspheres, are on the reflecting surface of a flat (first) planar mirror 16, and a second planar mirror 18 is positioned opposite the first mirror 16 and is oriented so as to be substantially parallel to the first mirror, but need not meet the strict requirements of alignment of prior resonators discussed in the background. Tolerances away from parallel are implementation dependent, but use of the microrefractive elements creates a system that can tolerate several degrees from parallel in theory apart from physical limitations of the mirrors, e.g. ~0-7 degrees away from parallel. In a practical realization the size and separation of the mirrors will limit the amount of deviation from parallel. For example, in experiments, misalignment by more than about 0.1 degrees would have caused the mirrors to crash into each other as they were moved toward each other to create the desired separation between the mirrors. Larger separations or smaller mirrors can tolerate larger misalignments from parallel. Prior systems that require parallel alignment fail to lase at about 1-2 seconds of arc of misalignment, where 1 second of arc is 0.000277778 degrees. The important point is the microsphere refractive elements stabilize the system such that the mirrors do not require such precise alignment, which therefore permits liberal manufacturing tolerances compared to such prior devices.

The microsphere refractive elements 14 stabilize the resonator 10 and a laser beam 20 is supported at each microsphere position. Each microsphere 14 either simply rests on its micromirror or is attached to it by any one of a variety of material films. Many commercially available transparent adhesives are suitable for this. Example experimental devices used an optically clear adhesive tape sold by ThorLabs. A gain medium 22 between the mirrors provides gain for lasing. Lasing is induced with an optical pump 24. Example gas media include HeNe, nitrogen, argon, carbon monoxide, carbon dioxide, and metal vapors. Example liquid media include organic dyes and colloidal quantum dots.

Figure 1B:
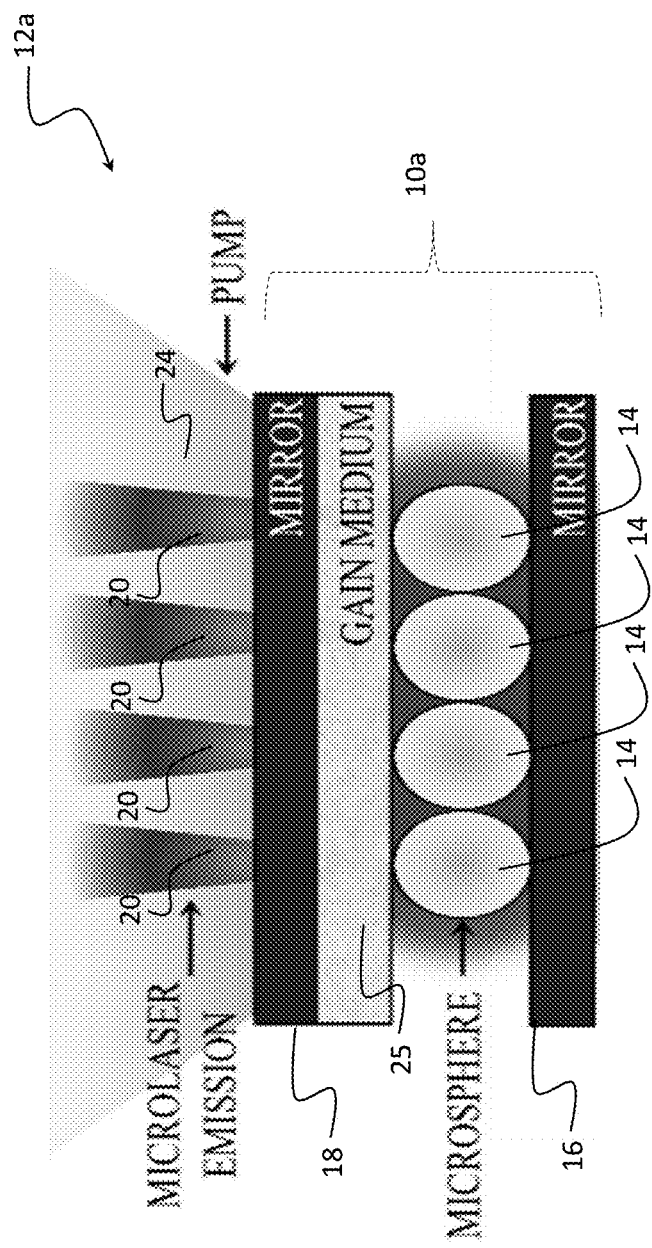
FIG. 1B is a schematic diagram (in cross-section) of preferred embodiment resonator and laser of the invention based upon FIG. 1A with a solid gain medium.
Figure 1C:
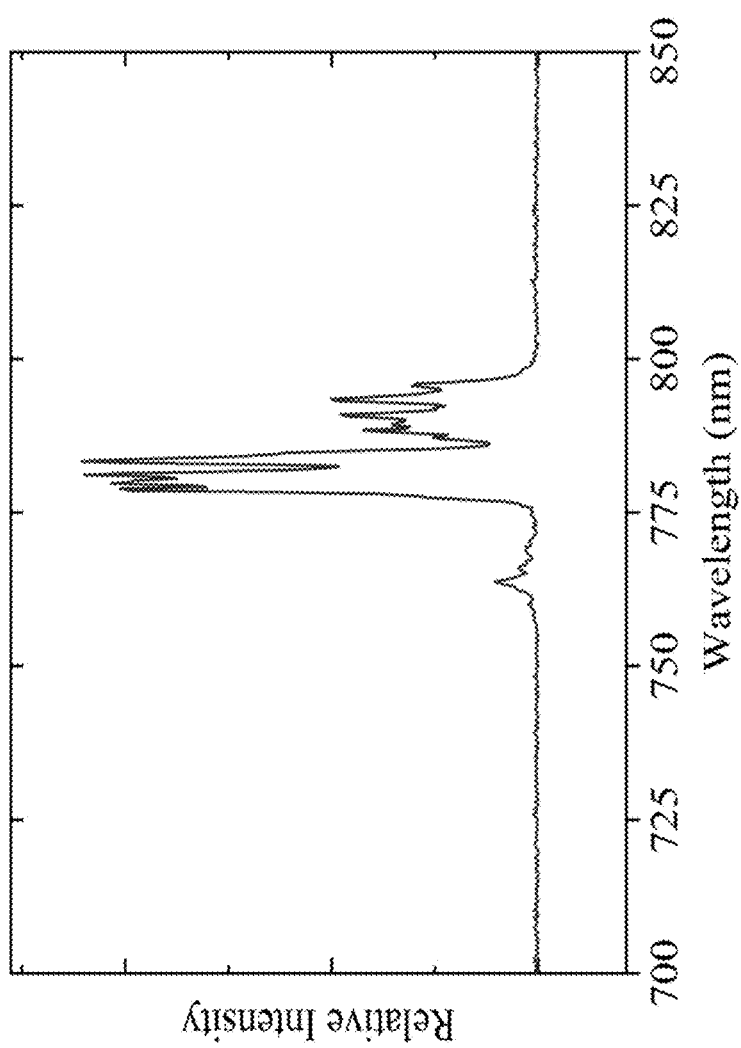
FIG. 1C are spectra from a solid gain medium laser in accordance with FIG. 1B.

FIG. 1B shows a similar preferred resonator 10a and laser 12a of the invention. The resonator 10a and laser 12a are based upon the resonator 10 and laser 12 of FIG. 1A, but use a solid gain medium 25 instead of the liquid or gas medium 22 of FIG. 1A. The solid gain medium 25 contacts the microspheres and the mirror 18. The FIG. 1B embodiment has been tested, and lasing spectra of the solid-state gain medium (Ti:Al$_2$O$_3$) is shown in FIG. 1C. Solid-state gain media as in FIG. 1B are preferred to incorporated resonator and lasers of the invention into existing high power laser systems. The pump light/power/wavelength will depend on the gain medium. Generally, the pump wavelength is selected to match the absorption profile of the gain medium being used. In an example experimental device consistent with FIG. 1A with a liquid colloidal quantum dot gain medium, mirrors that transmit ~94% of the pump light and reflect >99.99% of the emission were used. The example device was pumped with a pulsed Nd:YAG laser (~8 ns pulse duration). Nd:YAG is also an example solid medium that could be used as a gain medium in embodiments of the present invention. Another example solid state medium is Yb:YAG.

The FIG. 1A laser and resonator have been demonstrated experimentally with a liquid colloidal quantum dot gain medium. In example experimental devices, microsphere refractive elements were fabricated from polystyrene and had diameters of 10-200 µm (micrometers) but both smaller and larger diameters are also acceptable. Depending upon the separation between the mirrors and the diameter and transverse mode that are desired for the resulting laser beam, calculations based upon the data in FIG. 2 will determine the diameter required for the sphere(s). The material from which the microspheres are fabricated can be chosen from a wide range of solids (and liquids and gases inside solid shells (e.g. commercially available Rhodamine or LDS laser dyes)), including sapphire, glass, diamond, and infrared materials such as Si and ZnSe. Other embodiments use a biological cell as a lens. Furthermore, the refracting element need not be a microsphere but could also be a sheet of molded glass hemispheres, for example, or micro-GRIN (graded refractive index) lenses. Practically any refracting element can be used. The index of refraction of the microrefracting element must be greater than the surrounding medium, which in FIG. 1A is the gain medium in the cavity between the mirrors 16 and 18. The focal length of the microrefracting element and mirror separation are chosen so as to make the cavity stable. In the example case of polystyrene surrounded by water, the range of stability is between D and 2D, where D is the diameter of the sphere.

The specific gain medium chosen for most of the example experiments to demonstrate the invention was a liquid comprising colloidal quantum dots in a solvent. The gain medium may also be a solid or a gas. In an example experimental embodiment consistent with FIG. 1B, a Ti:sapphire resonator/gain medium system is pumped optically and lasing occurs only at positions that are defined by the positions of the spheres on the mirror, as well as the diameter of the spheres and the mirror separation.

The resonator 10 of FIG. 1A has been analyzed (with an ABCD ray transfer matrix algorithm to determine how the beam propagates through the cavity). Example calculations presumed a microsphere diameter of 80 µm, and the beam diameter is predicted to be approximately 3 µm for cavity lengths up to 120 µm. For larger values of L, the spot size rises rapidly.

Figure 2:
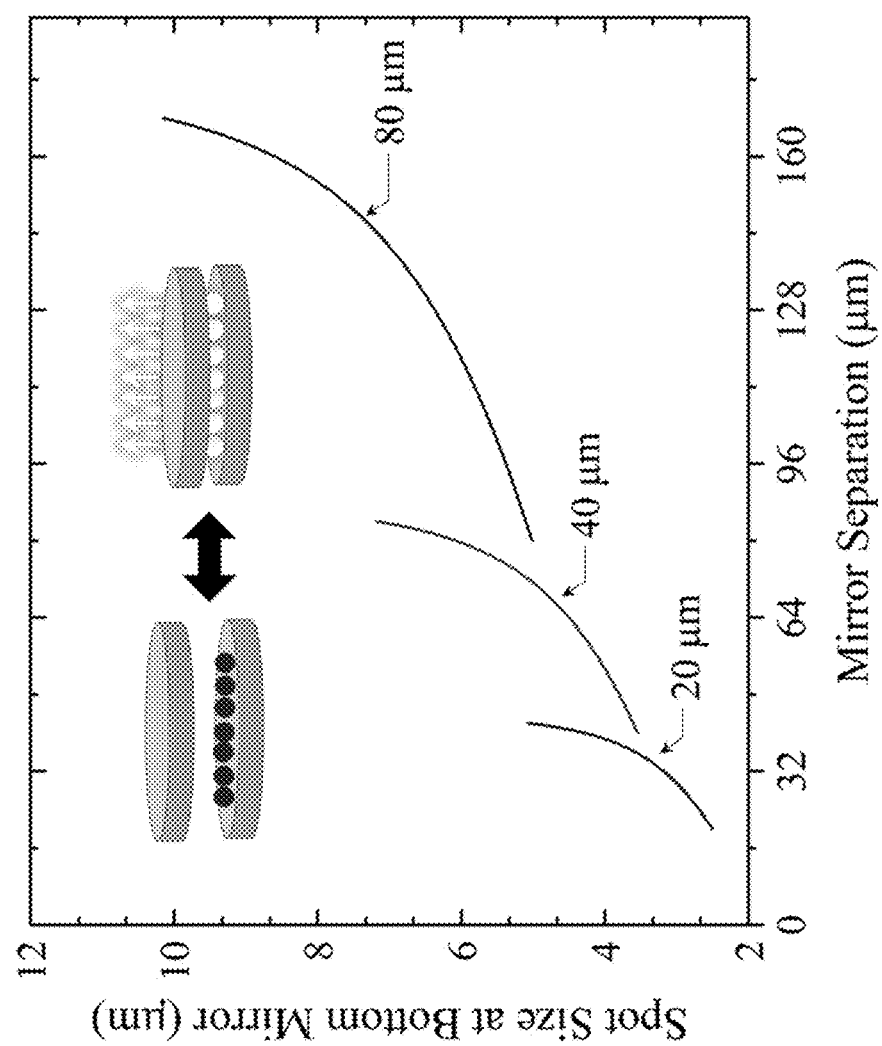
FIG. 2. are simulated data based upon a liquid gain medium showing the relationship of microsphere size, laser spot size at the bottom mirror, and mirror separation, also indicating the range of separation permissible for lasing of the preferred embodiments in FIG. 1A.

FIG. 2 includes simulated data showing the relationship of microsphere size, laser spot size at the bottom mirror, and mirror separation, also indicating the range of separation permissible for lasing. The three curves are for different sphere sizes of 20 µm, 40 µm, and 80 µm. The permissible mirror separation (cavity length) for the 20 µm microspheres ranged from ~21 µm-46 µm. The permissible mirror separation (cavity length) for the 40 µm microspheres ranged from ~41 µm-80 µm. The permissible mirror separation (cavity length) for the 80 µm microspheres ranged from ~81 µm-170 µm.

Figure 3:
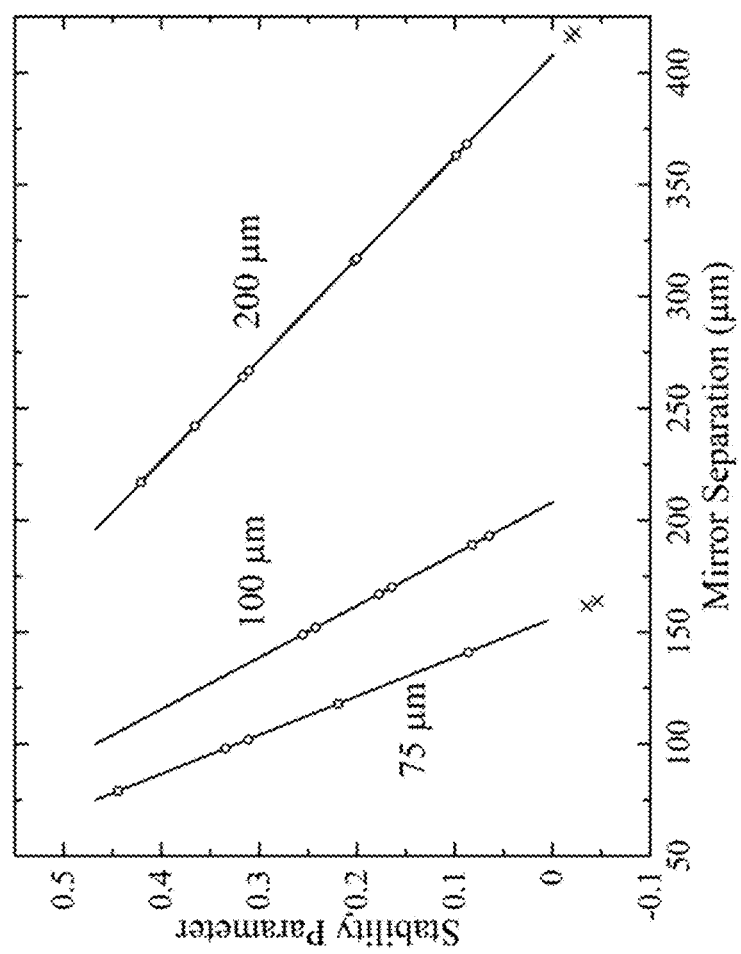
FIG. 3 plots data from calculations and experiments regarding the stability of the resonators of FIG. 1A-1C.

FIG. 3 shows the results of both calculations and experiments to explore the stability of the resonator of FIG. 1. The solid lines represent the region of stability for a micro sphere of a given diameter while varying L over the indicated range. Experimental points indicate whether lasing was obtained ("o") or not ("x"). The three lines in FIG. 3 correspond to different values of the microsphere diameter: 75 µm, 100 µm, and 200 µm. The lines themselves indicate the region in mirror spacing over which a given sphere of a specific diameter will yield a stable cavity. It is clear from FIG. 3 that the experiments are in excellent agreement with theory. Specifically, experiments conducted anywhere along any of the three solid lines yielded a laser. However, no lasing was observed if the experiments ventured off any of the lines.

Figure 4:
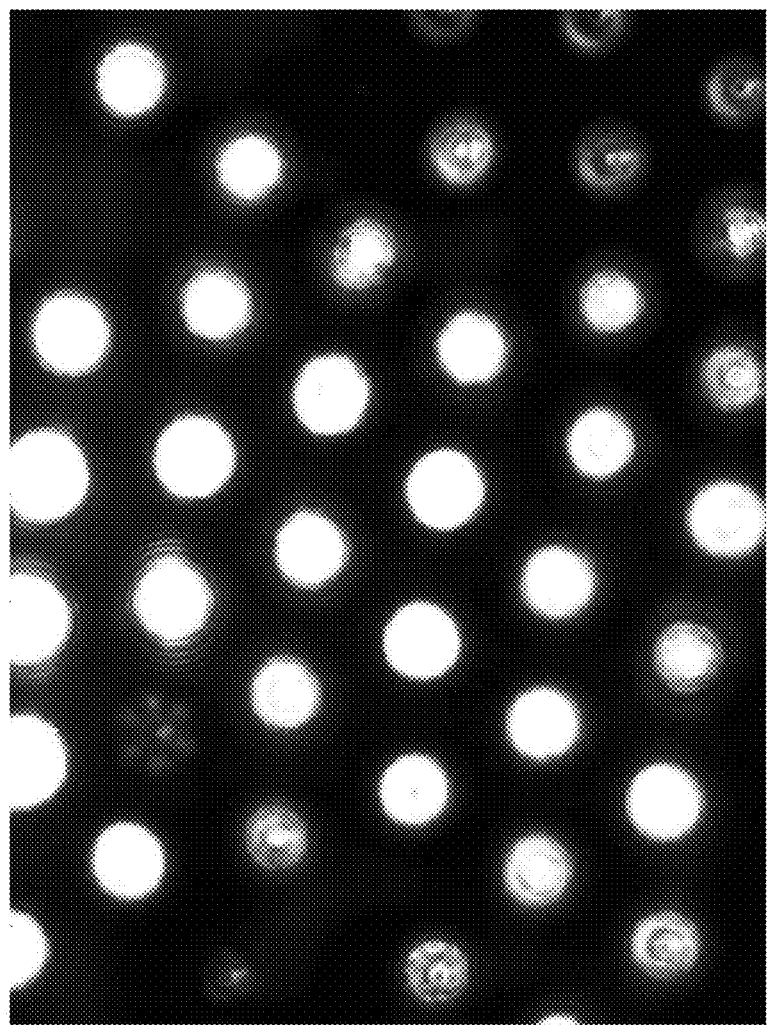
FIG. 4 is an optical micrograph of a portion of an experimental system of FIG. 1A with a liquid colloidal quantum dot gain medium in which several spheres are lying on the surface of a mirror.

FIG. 4 is a photograph (acquired with a microscope and a CCD camera) showing lasing from an example experimental system in accordance with FIG. 1. Several microspheres, 10 µm in diameter, had been placed onto the surface of the lower mirror. FIG. 4 shows that lasing is not occurring anywhere on the surface of the mirror except at those locations occupied by a microsphere. The laser beams produced from each of the microspheres are coming out of the page and are smaller in diameter than the associated microsphere itself. Thus, lasing is occurring only at positions of the mirror surface occupied by a microsphere. Lasing is evident by the bright spot within each sphere, and each of these microlaser beams is emerging from the resonator out of the page.

Figure 5B:
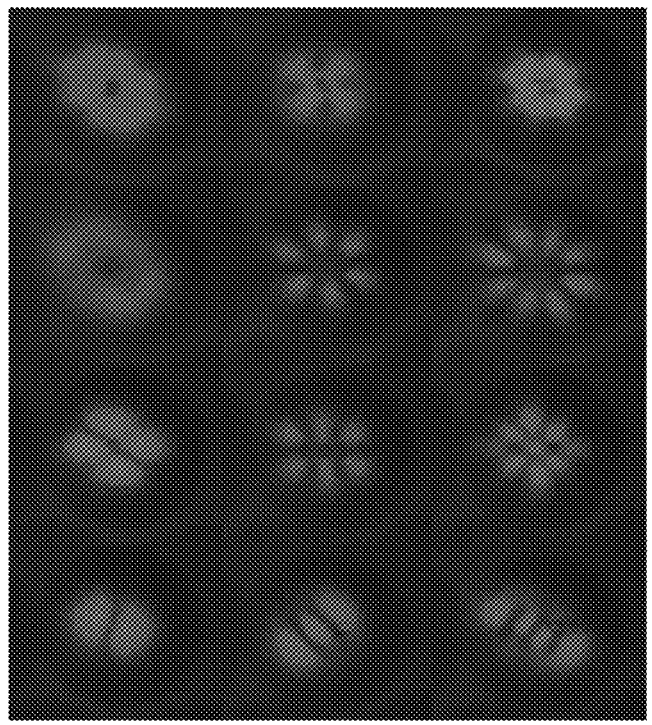
FIGS. 5A and 5B each include a series of optical micrographs showing the transverse modes of the laser beam produced by the experimental embodiment according to FIG. 1A.
Figure 5A:
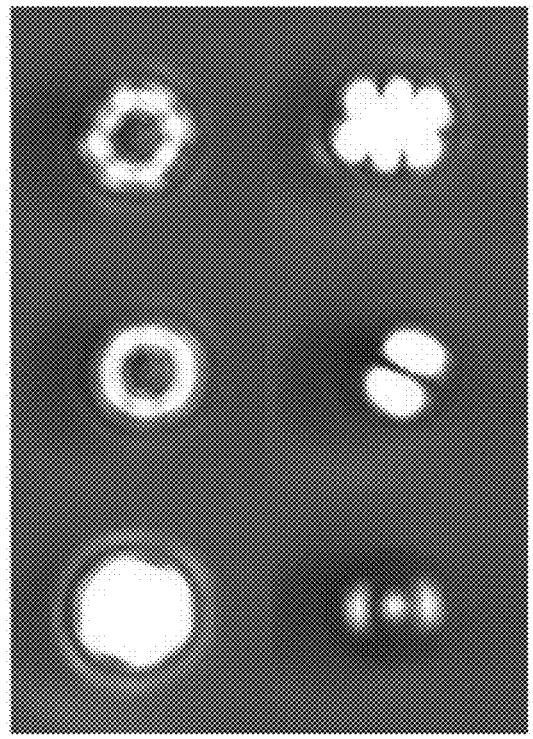

Resonators of the invention provide not only spatial selectivity in the realization of lasing within the resonator, as well as a set of parallel laser beams emerging from the resonator, but also provide control over the spatial properties of the laser radiation produced (i.e., the laser mode). When the microspheres are large (typically more than 100 µm), many transverse modes are observed in the laser output associated with a single sphere, and the mode switches frequently from one transverse mode to another. Consider, for example, FIGS. 5A and 5B which comprise a series of photographs of a single polystyrene sphere in a laser system consistent with FIG. 1B. The diameter of the sphere is 75 µm and the photographs show a few of the optical modes that one sees from a sphere of this size. The ring at upper left is a superposition of several transverse modes but single modes (TEM12, TEM10, and TEM02) appear in the images in the lower row. Notice, for example, that the well-known $TEM_{10}$ and $TEM_{02}$ modes are observed in the two left-hand images on the lower row of FIG. 5A. For some applications of this technology, higher order transverse modes will be acceptable, but other applications will require only the lowest order spatial (transverse) modes to be generated. Experiments conducted with 10-75 µm diameter spheres have found that by simply reducing the sphere diameter, the laser mode can be forced to be $TEM_{00}$ (the lowest order mode, whose beam is circular). Taking into account the refractive index of the gain medium, single-mode operation occurs near the upper edge of stability (see FIG. 2; for example, single-mode for an 80 um microsphere would occur at a mirror separation close to ~159 um.). The microsphere size can also be reduced to achieve single mode operation. With reference to FIG. 2, the 20 µm is stable over a small range of mirror separation (~21-40 µm).

The experiments have demonstrated that the system of FIG. 1 will generate an array of laser beams, all of which are parallel and have a spot size (beam width) that is determined by the sphere diameter and the mirror separation. The individual beams are of high optical quality and can be combined after they have left the laser. Furthermore, the number of laser beams can be in the tens of thousands or even millions. Convective assembly is a technique that can produce such numbers of microrefractive elements. See, e.g., Fleck et al., "Convective Assembly of a Particle Monolayer," Langmuir, 2015, 31 (51), pp 13655-13663.

A variation is based upon two-dimensional photonic crystals of close-packed microspheres on the surface of one mirror. With this arrangement, a single resonator of modest size (2.5-5.0 cm (1"-2") diameter mirrors) is expected to produce at least hundreds of millions of laser beams that are virtually identical and separated by only a few micrometers to less than 20 µm. The number of beams is only limited by the size/packing per unit area of the microspheres and the total surface area available.

A single beam can be obtained solely by allowing the multiplicity of beams to diffract, which occurs naturally at sufficient distance as beams overlap or can be achieved with a lens. In addition, the embodiment of FIG. 1 allows for one to engineer the specifications of a single beam that is formed by the combination of beams produced within the resonator. For example, the microspheres located on the surface of the lower mirror can be of two (or more) specific diameters and arranged on the mirror surface in the form of two interlaced arrays of spheres. The larger spheres will generally produce a beam of larger spot size and the mode will not (in general) be of the lowest order. However, the smaller spheres could, for example, be chosen to support only the lowest order mode. Through such "beam engineering" facilitated by careful choice of the geometric distribution of spheres and their size, laser beams having characteristics not available with conventional lasers and resonators will be attainable.

Applications for resonators and lasers of the invention are numerous. One example application improves performance of a family of lasers known as disc lasers. Disc lasers have a thin, rare earth-doped glass or crystalline disc as the gain medium. See, A. Giesen, "Scalable concept for diode-pumped high-power solid-state lasers," (Appl. Phys. B, vol. 58, 365 (1994)), disc lasers have been shown to generate laser powers of tens of kilowatts. However, heating of the laser medium by the pump source has a severely adverse impact on the beam quality. While disc lasers can satisfy high-power requirements, these lasers are limited to applications such as welding, where beam quality is not critical. The $M^2$ parameter describes the beam quality in terms of the fundamental (highest quality) mode being $M^2=1$, and increasing values of $M^2$ represent a degradation in quality. For many commercially available disk lasers this value ranges from $M^2 \sim 6$ to 25 (depending on the power of the laser).

Figure 6:
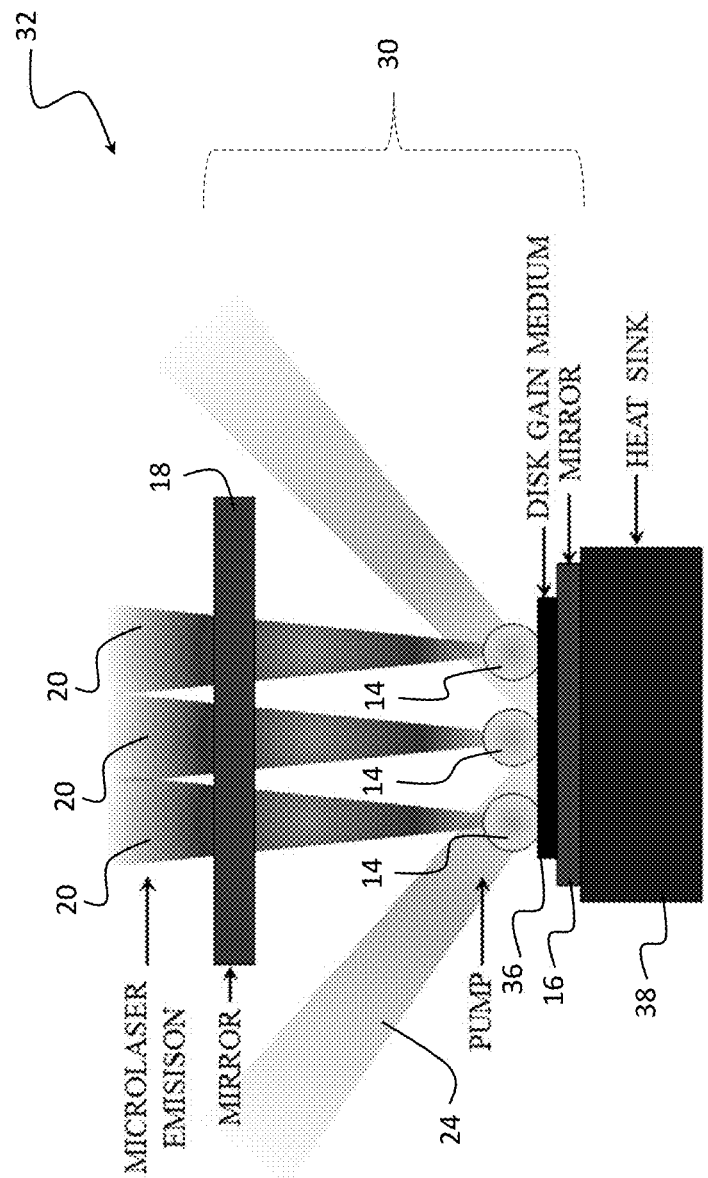
FIG. 6 is a schematic cross-sectional diagram of a variation of the FIG. 1A preferred embodiment including a thin disc gain medium laser of the invention.

FIG. 6 shows a preferred resonator 30 and disc laser 32 constructed in accordance with the invention. The resonator 30 includes many features that are common with the resonator 10 of FIG. 1, and such features are labelled with common reference numbers. In the disc laser 32, the gain medium is a rare earth doped disk 36 (as in Geisen) and pump laser 24 enters from an angle to the disk 36. A heat sink 38 cools the system. The laser 32 permits 1) an increased rate of cooling of lasing regions in the disc 36, and 2) control of the mode quality of the individual beams 20, thereby improving the quality of the overall beam produced by the laser 32. The pump source 24 is schematically represented for purpose of clarity, but in practice preferably fully illuminates all of the microspheres 14. In the resonator 30 and the laser 32, the microspheres 14 are upon the disk 36 and the mirror 16 is a thin mirror between the heat sink 38 and the rare earth-doped disc 36. The mirror should be thinner than the beam diameter, and is preferably in range of ~0.1-1 mm. The thin mirror allows heat to permeate through to the heat sink. Lasing will occur only where the microspheres 14 are located and, therefore, heat generated in the lasing regions will quickly diffuse into adjacent, non-pumped, areas of the disk gain medium 36.

Figure 7:
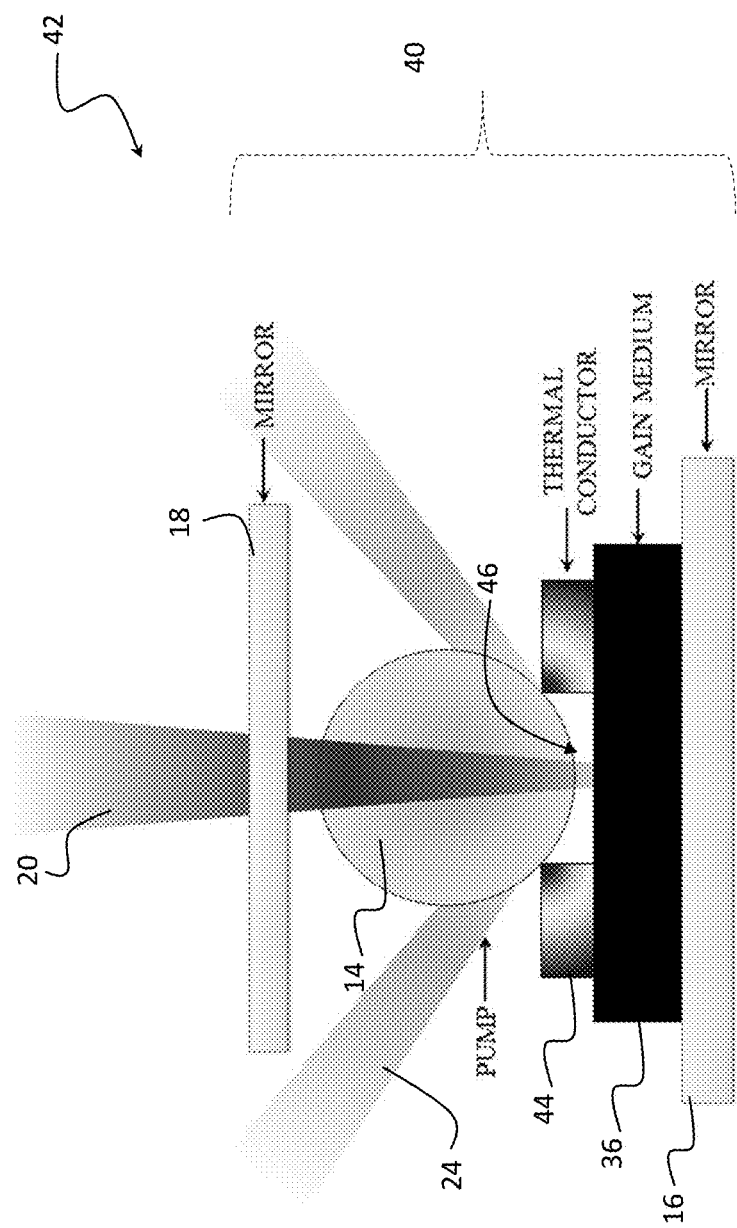
FIG. 7 is a schematic cross-sectional diagram of a variation of the FIG. 1A preferred embodiment including a thermally-conducting grid.

FIG. 7 shows a preferred resonator 40 and disc laser 42 constructed in accordance with the invention, which is a variation of the FIG. 6 resonator 30 and disk laser 32. The resonator 40 includes many features that are common with the resonator 40 of FIG. 6, and such features are labelled with common reference numbers. In the resonator 40 and disk laser 42, the upper surface of the solid disk gain medium 36 includes a patterned thermal sink 44, which can be formed from a pattern of high thermal conductivity, such as a diamond or copper film, that will quickly conduct heat away from the regions of the gain medium 36 that are pumped and, therefore, heated. This patterned thermal sink 44 can be in the form of a grid, and the spheres can be positioned within the openings 46 of the grid (which can be square, honeycomb, etc.). The microspheres 14 (only one is shown in the schematic diagram) rest in openings in the grid thermal sink 44, and the surfaces of the microspheres 14 can be in contact with the surface of the mirror 16, or can be spaced away a predetermined distance from the surface of the mirror 16 that is controlled by the size of openings 46 and the size of the microspheres 14. The size of the microsphere(s) 14 can also be selected to a predetermined size that ensures fundamental mode operation. The thermal properties of the grid heat removal system can be optimized by using materials that conduct heat, such as copper and aluminum. Beam quality can thereby be high enough for industrial and defense applications even at high power levels required by such applications. Additional applications include materials processing, laser printing (for example Stereolithography), laser medicine (such as dermatological treatments and tattoo-removal).

Figure 8:
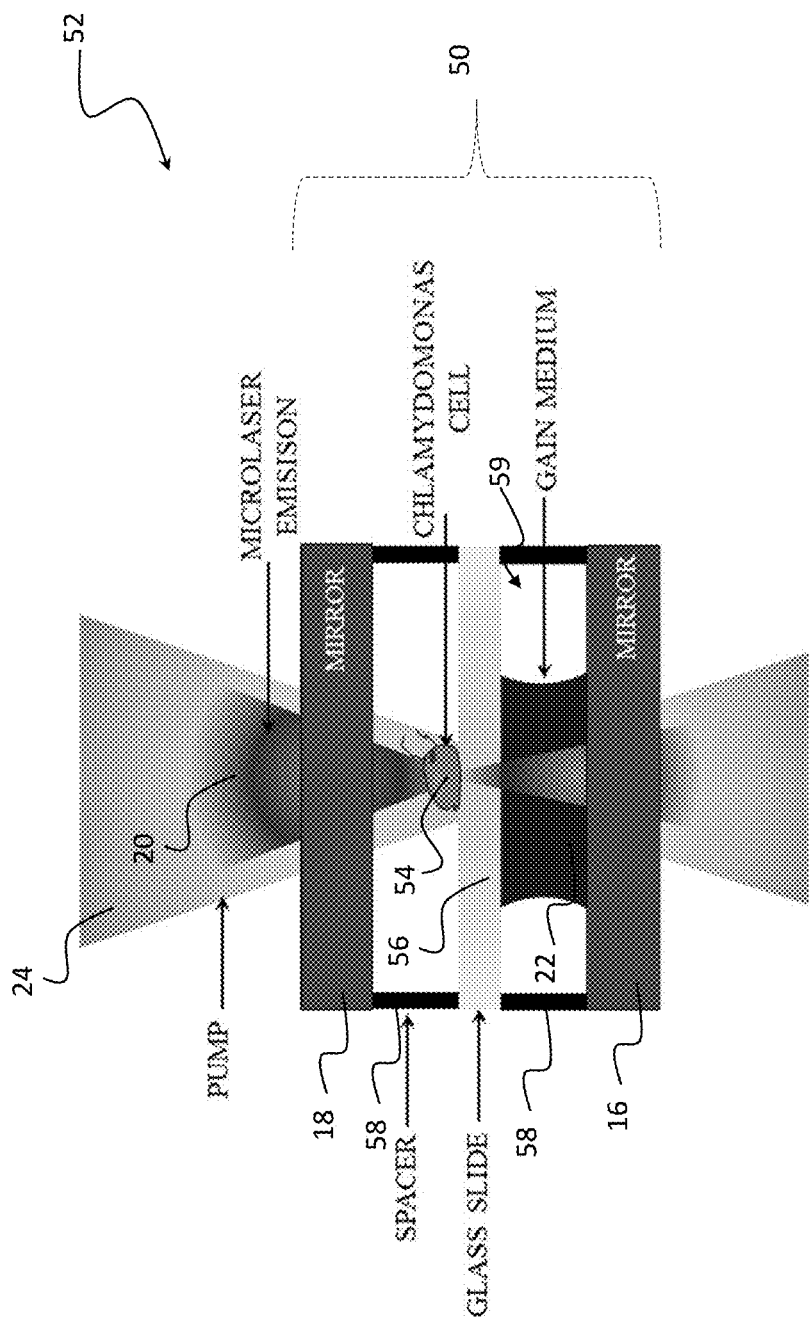
FIG. 8 is a schematic cross-sectional diagram of a variation of the FIG. 1A preferred embodiment including a biological cell as a refractive element.

FIG. 8 shows a preferred resonator 50 and laser 52 constructed in accordance with the invention. The resonator 50 includes many features that are common with the resonator 10 of FIG. 1, and such features are labelled with common reference numbers. Instead of a microsphere 14 as in FIG. 1, the resonator element is a biological element 54. The biological element, e.g., an algae single cell organism, can stabilize the resonator 50 and support lasing. The experiment used *Chlamydomonas Reinhardtii*. Other microalgae cells can be used, for example Globe algae (volvox). Other examples with a sufficient index of refraction include Gonium, Pandorina, Eudorina, Pleodorina. A sufficient index of refraction is greater than the refractive index of the surrounding medium. The biological element is upon a window 56, e.g. a glass slide, separated from the mirrors 16 and 18 by spacers 58 to divide a resonator volume 59 into two sections. The lower of the two sections of the resonator volume 59 contains the gain medium 22 while the upper half contains a biological solution containing living cells. Experiments have demonstrated that the motile single-celled organism known as *Chlamydomonas Reinhardtii* can serve as a resonator element. Because of the structure of these particular cells and the variation of the index of refraction across the cell, in particular, the central portion of the cell acts as a lens and lasing occurs in the resonator of FIG. 8 only when a cell ventures into the pump beam. Notice that, in this embodiment, the "lens" (resonator element) need not be in contact with either mirror of the resonator. Videos of this embodiment in operation have been obtained, and the transverse mode of the laser beam that is produced by the interaction of the cell with the resonator can serve as a diagnostic of the structure of the cell. The embodiment allows for real-time observation of cellular structure as well as the axial and longitudinal position of motile cells as they move. Since the *Chlamydomonas* cells move in response to light, they can be used to change the properties of the emitted microlaser beam in real time. Any cell within the pump beam 24 (which can be dispersed over a broad area, maintaining a pump fluence that will not allow lasing unless a cell is present) will automatically be imaged and its instantaneous position can be recorded by a computer. Thus, the position and movement of cells can be tracked in real time via the lasing.

Figure 9:
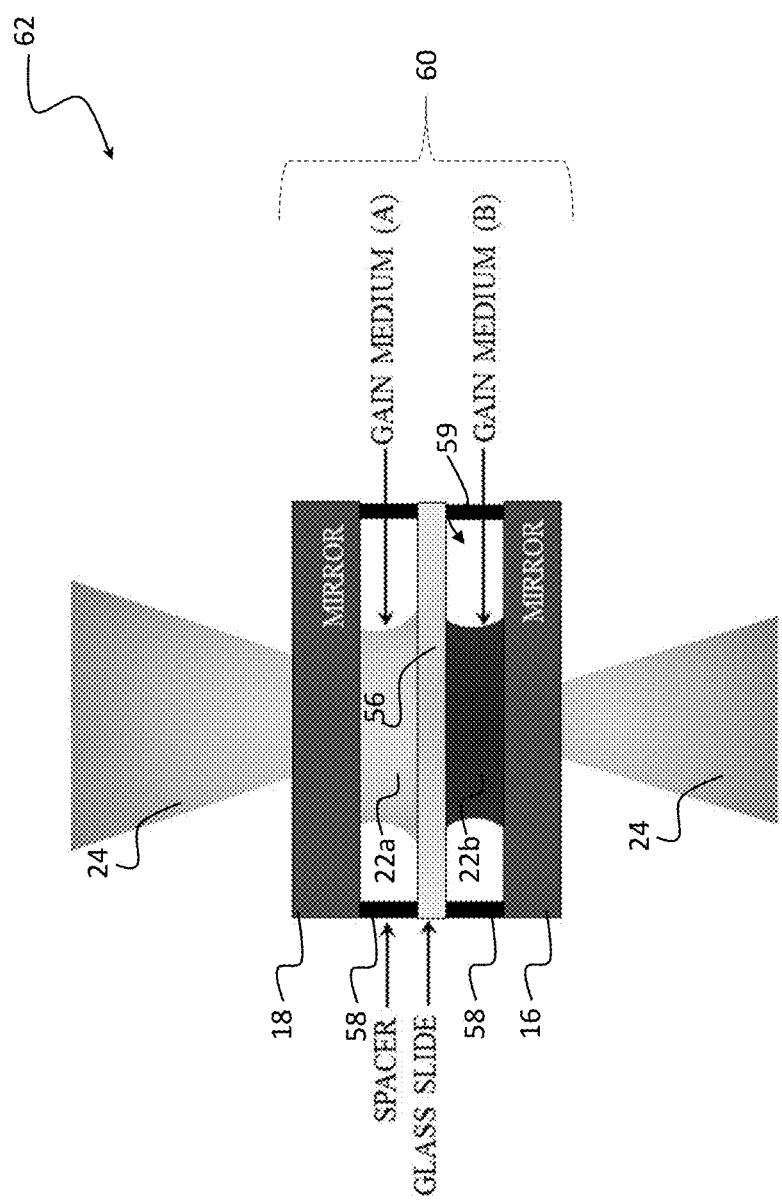
FIG. 9 is a schematic cross-sectional diagram of a variation of the FIG. 1A preferred embodiment including a divided gain region having two separated gain mediums.

FIG. 9 shows a preferred resonator 60 and laser 62 constructed in accordance with the invention. The resonator 60 includes features that are common with the resonator 10 of FIGS. 1, 6 and 7, and such features are labelled with common reference numbers. The laser 62 is configured a master oscillator-power amplifier (MOPA), it is pumped from one side but transmission occurs through both mirrors 16 and 18. The volume 59 of the resonator between the mirrors 16 and 18 is divided into two sections, both of which exhibit optical gain and include different gain media 22a and 22b. The operation is such that one gain medium can influence the other. For example, if 22a can't lase due to a lack of gain, then 22b can make up for this deficiency, thereby producing laser action. The refractive properties necessary to stabilize the resonator 60 can be supplied by microspheres (such as those of FIGS. 1, 6, and 7) on the slide 56 or by microspheres (not shown) suspended in the gain media (liquid or solid). An advantage of this embodiment is that one or both of the gain media can contain, for example, particles (such as dye or rare earth-doped spheres) that are able to supply both the refractive properties required for lasing but also provide optical gain.

Figure 10:
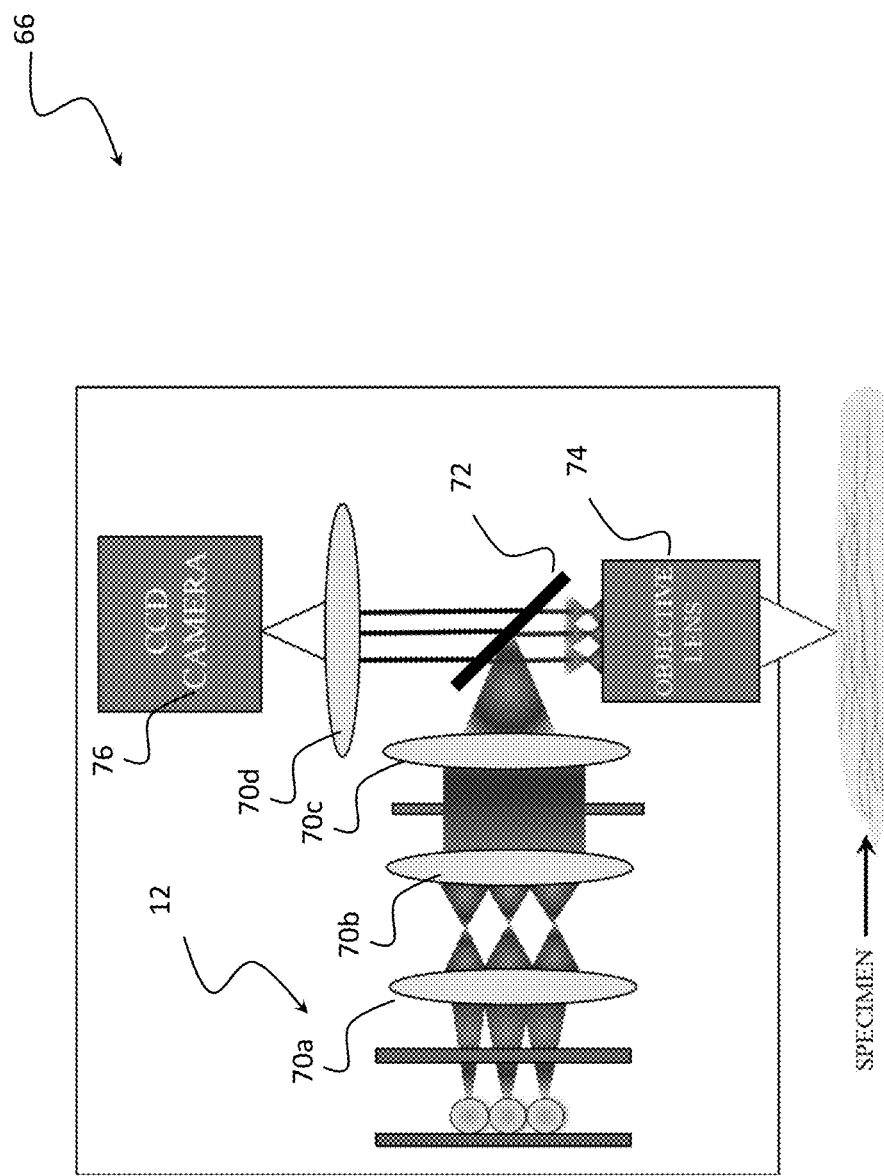
FIG. 10 is a schematic diagram of a preferred imaging system of the invention.

Lasers of the invention can be used in any standard imaging system. FIG. 10 shows a preferred embodiment imaging system 66 that exploits the multi-laser beam character of the invention to examine the microscopic structure of a surface. The system uses a laser of the invention, such as a laser 12 of FIG. 1 (though any of the lasers of the invention can be used). The laser 12 emits, for example, thousands of beams, and optical lenses 70 a dichroic mirror/beam splitter 72, and an objective lens 74 directs thousands of laser beams onto a specimen and images the backscattered radiation onto the pixels of an image sensor 76, such as a CCD camera. The collection of backscattered light from the sample with a pixelated detector, in conjunction with a multiplexed illumination source provided by the embodiment, results in a highly parallel confocal microscopy imaging system. Furthermore, the low spatial coherence for uncoupled arrays in the far-field enables the reduction of speckle noise when imaging biological samples, such as tissues. The system 66 is able to provide phase and amplitude data if a reference mirror is placed at the open port of the beamsplitter 72 to create an interference pattern at the image sensor 76. The phase and amplitude data retrieved from the backscatter enables images of greater contrast and resolution to be generated, in comparison with systems that record only amplitude information. Polarization information can also be obtained, via insertion of a quarter wave plate or polarizer into the optical pathway leading to the camera. The image sensor 76 images all of the laser beams produced by lasers of the invention onto a surface (through the two lenses 70a and 70b closest to the laser 12). Backscatter from the specimen, collected from all the points on the surface of the specimen at which the laser beams arrive, is then imaged onto the pixelated detector the image sensor 76. By mapping each of the coordinates at the specimen surface onto a separate pixel of the sensor, the intensity and phase of the light emanating from each point can be recorded and stored on a computer. Analysis of this data will yield more information than is normally available with microscopic imaging systems that record and analyze only the amplitude of an optical signal. The data is easier to interpret if the array of lasers is aligned to the pixels.

Figure 11:
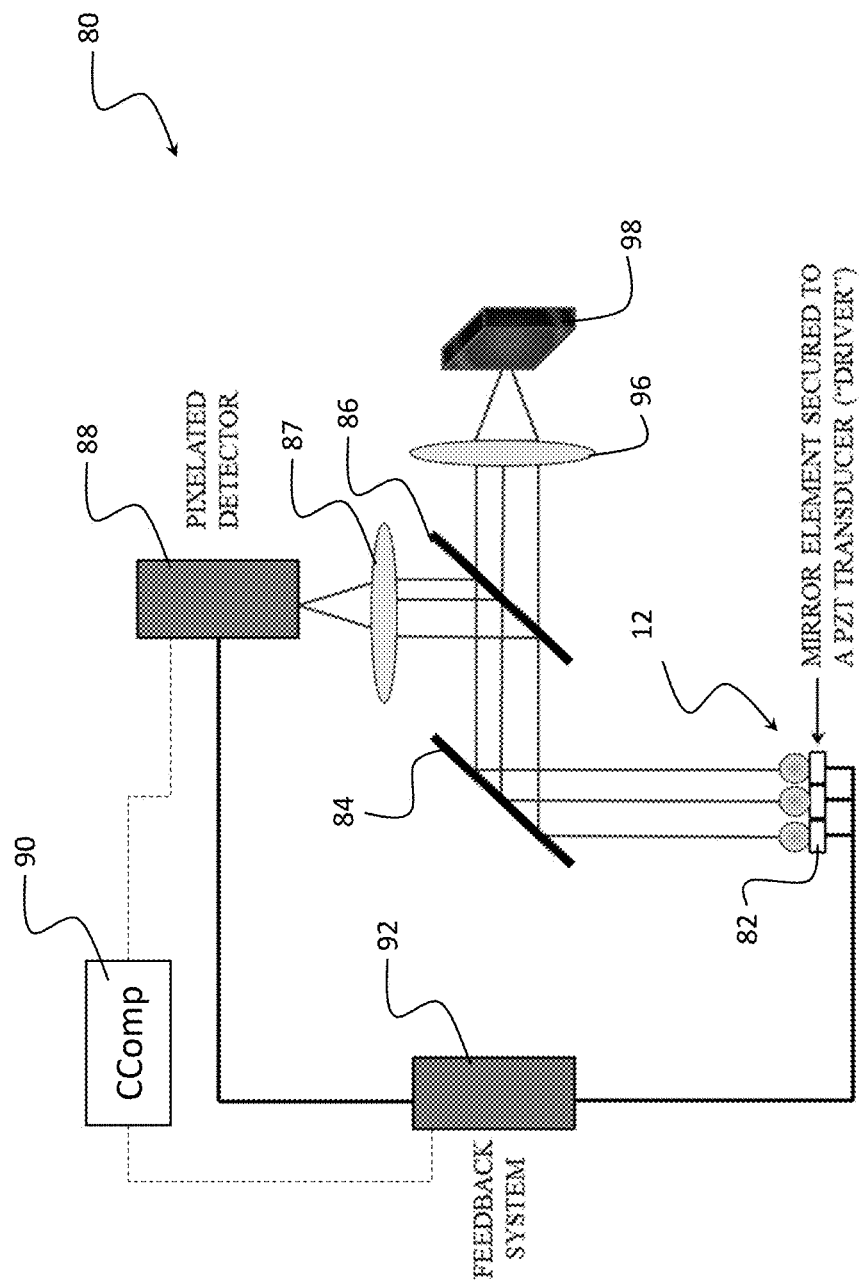
FIG. 11 is a schematic diagram of a preferred monitoring and feedback system of the invention.

FIG. 11 shows a preferred embodiment monitoring and feedback system 80 of the invention. The system uses a laser of the invention, such as a laser 12 of FIG. 1 (though any of the lasers of the invention can be used and the laser 12 is represented schematically). Multiple laser beams, e.g. thousands, are produced by the laser 12. A PZT transducer 82 is included to move each or groups of a plurality of micromirror of the laser 12. The purpose of the PZT transducer/driver 82 is to moving each microsphere or groups of microspheres by at least one quarter wavelength of the laser along the path of the laser beam. That is, the transducer 82 serves to control the phase of each laser beam relative to the others. Each of the micromirrors can be mounted in an array that is secured by a frame to form effectively one segmented mirror. All of the beams from the laser are directed along an optical path established by an angled mirror 84 through a beam splitter 86 that removes predetermined small portion, e.g. up to about 10%, of the energy from the laser beams and directs this radiation through a lens 87 onto a pixelated detector 88 which monitors the phase and amplitude of each beam relative to all of the others. A computer 90 monitors this information and directs a signal through a feedback system 92 to individual transducers 82 of the laser 12 as necessary to correct the phase of any beam that is not in accord with the others. In this manner, a composite laser beam (comprising literally thousands or millions of laser beams of smaller power) is constructed for which all contributing laser beams have relative phases that are carefully controlled by a monitoring and feedback system. Similar approaches have been devised for "phase combining" the outputs of multiple fiber lasers, but the physical proximity of the laser beams that can be produced in the present invention, as well as the fact that all are pumped by the same optical pump, make this embodiment of the present invention a laser system capable of generating beams of unprecedented quality. The system 80 can be designed to combine multiple laser beams by carefully controlling the phase of each of the thousands of beams produced by lasers of the invention. The monitoring and feedback system is designed to control the phases of each of the hundreds or thousands or millions of laser beams generated by embodiments of the invention. The phase of each contributing laser beam is monitored and corrections as needed are communicated to a transducer that displaces its microsphere by distances no larger than one quarter wavelength. The system 80 also shows that lens 96 shapes the beam onto a target 98 such as to produce a diffraction limited spot for laser printing.

FIGS. 12A-12B illustrate a preferred fabrication process for a resonator and laser of the invention and FIG. 12C an image of an array of microspheres 14 onto the surface of a flat mirror 16 coated with a transparent optical adhesive 102. The resonator and laser can be in accordance with FIG. 1, but a specific hexagonal pattern of 12C is achieved for the array of microspheres 14. The process entails depositing the microspheres onto a silicone (PDMS) template 104 from a liquid 106 with a glass slide 108 via convective assembly. The translation of the substrate along with the evaporation of the colloidal microsphere liquid, injected in between a glass slide and the substrate, forces the microspheres 14 into wells 110 of the PDMS template 104. In convective assembly, the microsphere solution is injected between the hydrophilic glass slide 108 and the substrate (PDMS) 104. As the solution evaporates and the substrate is moved, the particles are forced to settle onto the surface. The patterned array of microspheres 14 is then transferred in FIG. 12B onto the mirror 16 by flipping and contacting the microspheres 14 with the adhesive 102. Separating the template 104 and the mirror 16 leaves the microspheres 14 in the hexagonal pattern (the microspheres are arranged in a hexagonal pattern) shown in FIG. 12C.

Figure 13:
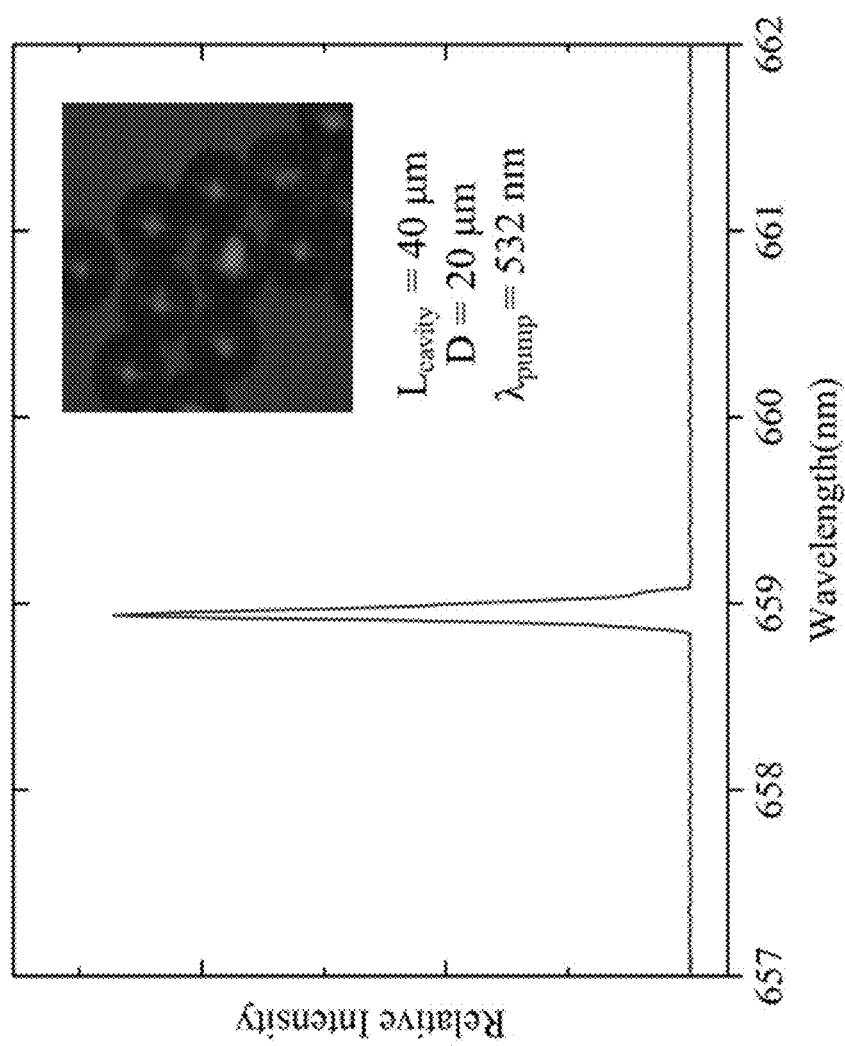
FIG. 13 includes data and an image that demonstrate single mode emission from individual microspheres in an experimental resonator and laser according to a preferred embodiment.

FIG. 13 is data that demonstrated single mode emission from individual microspheres in a resonator according to FIG. 1A, with a gain medium of colloidal quantum dots. The data of FIG. 13 were obtained with a cavity length (distance between mirrors) of 40 µm, a microsphere diameter of 20 µm, and a pump wavelength of 532 nm. The demonstrated single mode operation is important for making high quality laser beams, particularly those requiring higher powers. A single transverse mode can be selected by adjusting the distance between the two mirrors of the optical cavity and by changing the microsphere size. Single-mode operation typically occurs for a mirror separation that is close to twice the value of the sphere diameter. In this case, single mode lasing was achieved for a 20 um sphere with a cavity length of 2×20=40 µm.

FIGS. 14A and 14B include measured data for the lasing threshold for microspheres having diameters of 80 um and 20 um, respectively in a laser according to FIG. 1A. The data show that the lasing threshold scales with the sphere diameter.

Figure 15:
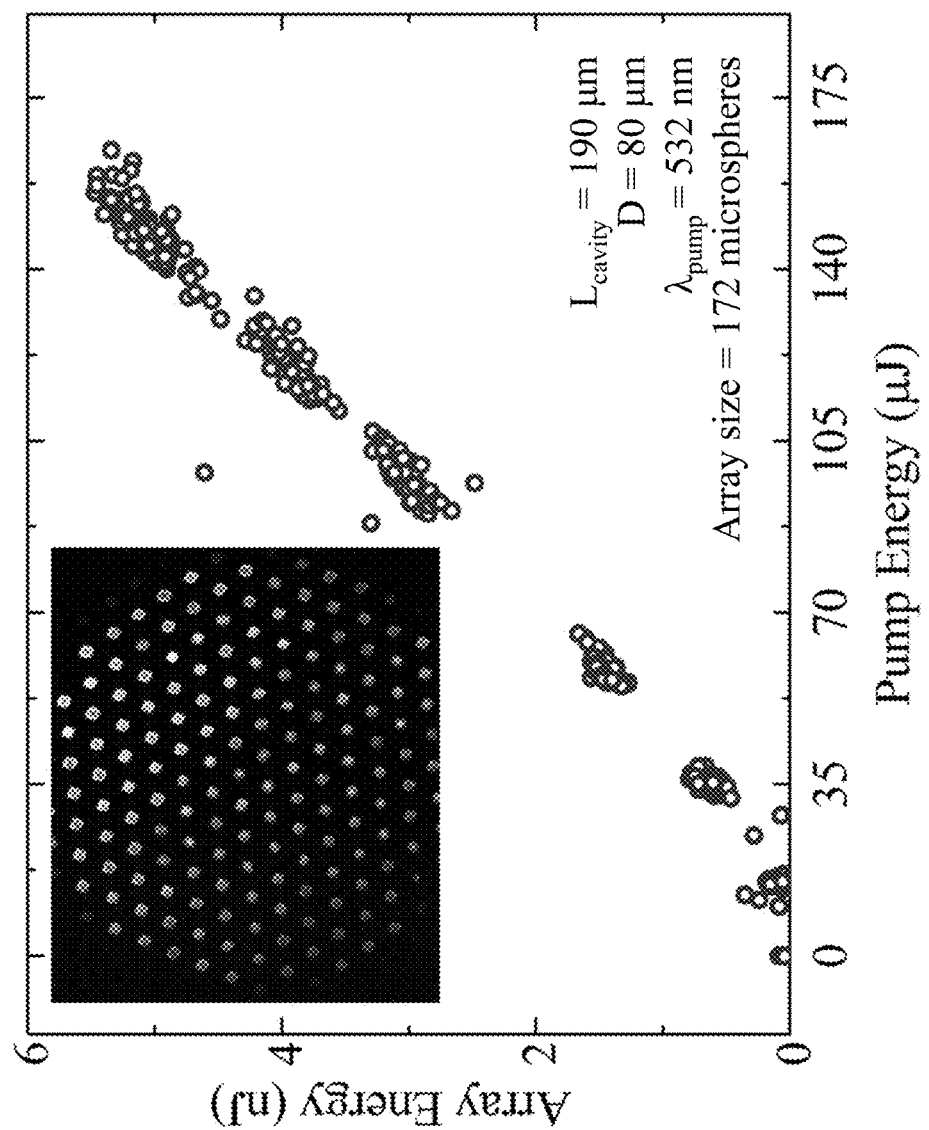
FIG. 15 includes measured data of the lasing threshold for a microlaser array of 172 spheres patterned using the method of FIGS. 12A and 12B to form a preferred embodiment laser.

FIG. 15 includes measured data of the lasing threshold for a microlaser array of 172 spheres patterned using the method of FIGS. 12A and 12B. The laser had a cavity length (distance between mirrors) of 190 µm, a microsphere diameter of 80 µm and a pump wavelength of 532 nm. In this case, the stability will not correspond exactly to the above experimental data regarding stability. This is because of the additional adhesive layer in the cavity, which effectively allows one to make the cavity longer for a given sphere size and still have it operate in the stable regime. The data show that the array of spheres effectively behaves as a single unit.

Figure 16:
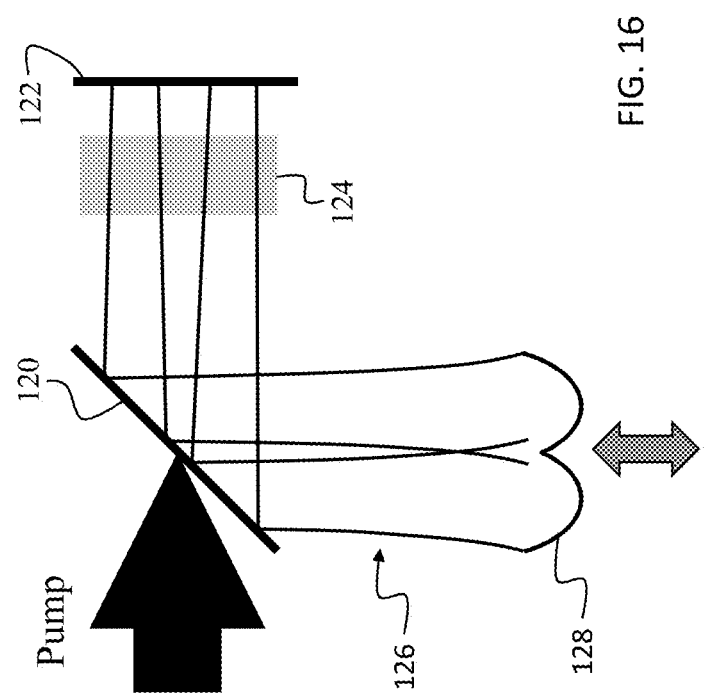
FIG. 16 illustrates an alternative arrangement to that of FIG. 11 for controlling the phase of individual microsphere lasers by employing a spatial light modulator.

FIG. 16 illustrates an alternative arrangement to that of FIG. 11 for controlling the phase of individual microsphere lasers by employing a spatial light modulator. In FIG. 16, two dichroic mirrors 120 and 122 are arranged with respect to a resonator or a plurality of resonantors 124 to produce slightly overlapping Gaussian beams 126 that are directed into a spatial light modulator 128. By controlling the relative phase of multiple resonators, they can be tuned in and out or resonance, allowing the coherence of the array to be adjusted.

Figure 17B:
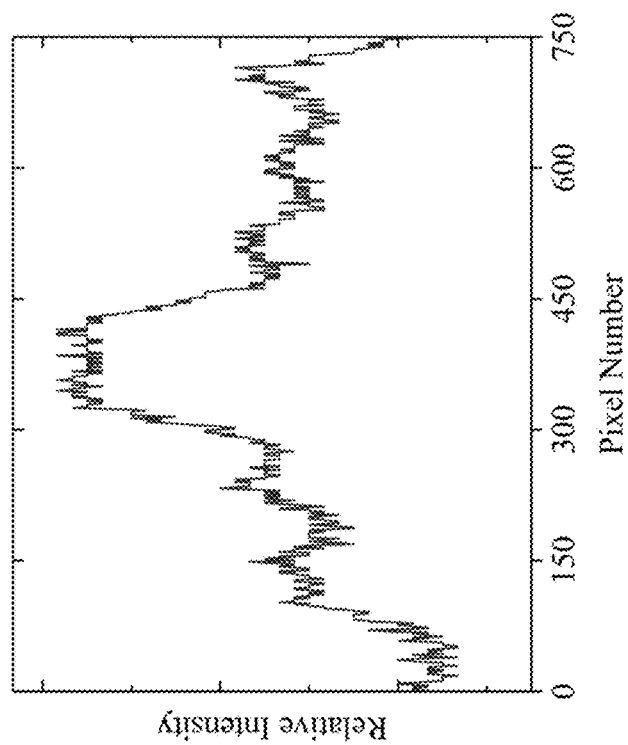
FIG. 17A is a far field image and FIG. 17B is a plot of the corresponding lineout obtained with an array of 172 microspheres.
Figure 17A:
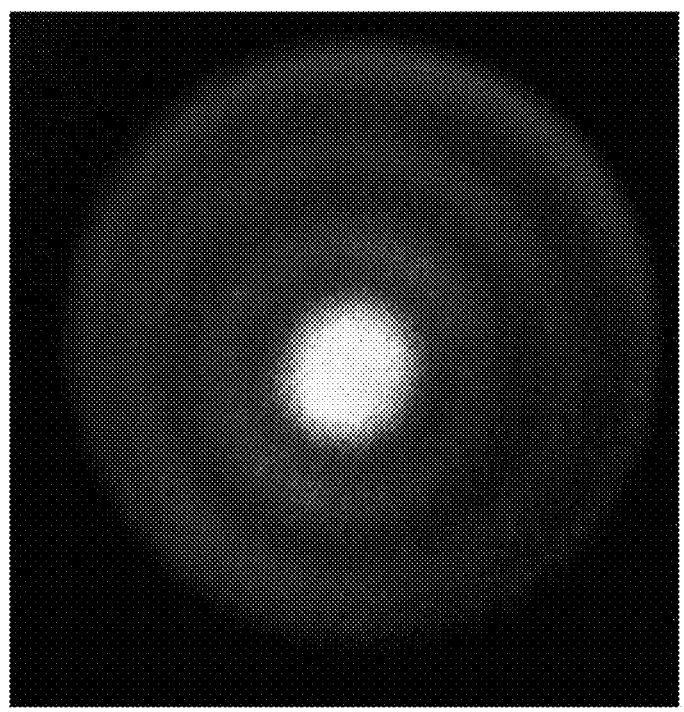

FIG. 17A shows far-field intensity distribution for a resonator with an array of 172 microspheres. The reduced speckle contrast in the far-field, depicted in the lineout of FIG. 17B, is an indicator of the limited beam coherence for an uncoupled (in the far field) microsphere array.

Figure 18B:
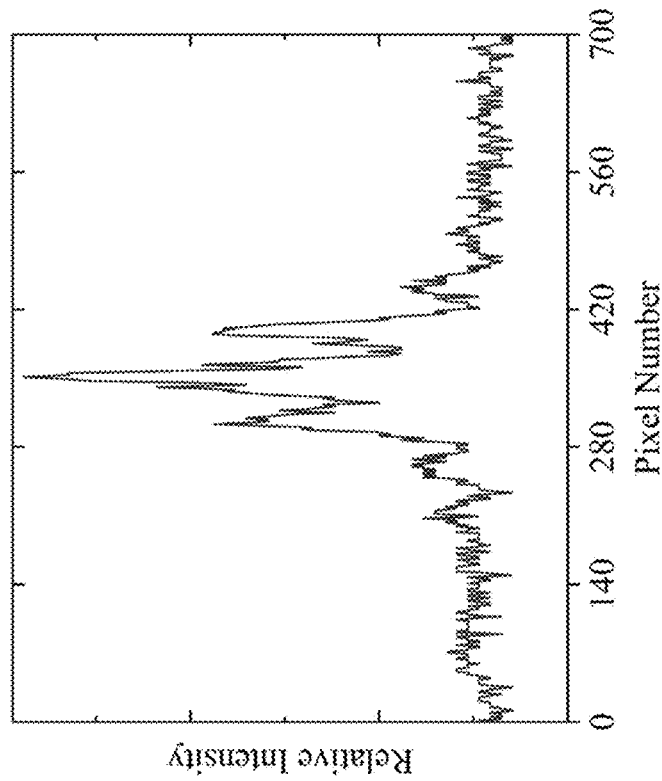
FIG. 18A is a far field image and FIG. 18B is a plot of the corresponding lineout obtained with a single microsphere refractive element.
Figure 18A:
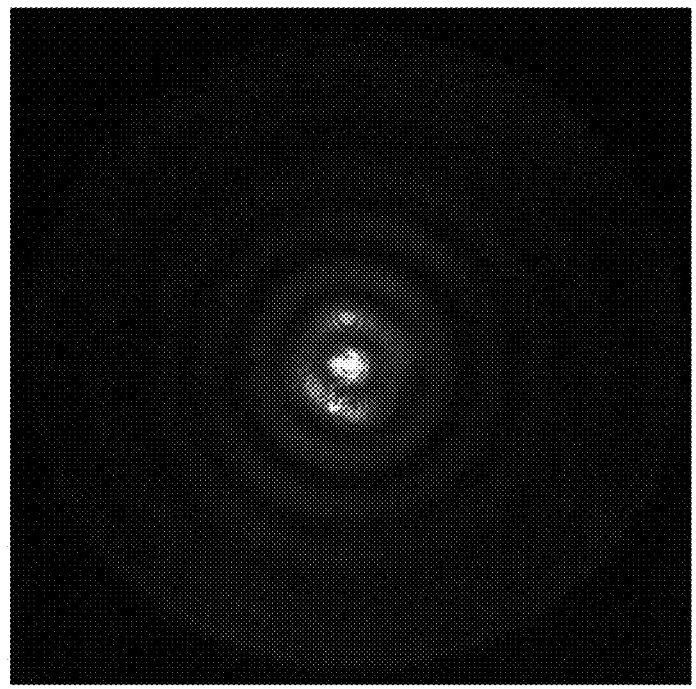

FIG. 18A shows far-field intensity distribution for a single sphere of a resonator. The lineout of the image in FIG. 18B, representing the intensity values of a horizontal line through the middle of the image, shows that a single sphere is coherent with itself. Both FIGS. 17 and 18 confirm that, to achieve coherent coupling in the far-field, one must control the phases of each microsphere laser beam (such as achieved in FIGS. 11 and/or 16).

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. An optical resonator, comprising:
opposing mirrors arranged substantially parallel to each other and separated to confine reflections therebetween;
a gain medium between the opposing mirrors;
a pump to pump the gain medium; and
a least one microrefractive element to stabilize the resonator, the microrefractive element being disposed between said opposing mirrors and configured and sized to support a laser beam at a position of the microrefractive element.

2. The resonator of claim 1, comprising a plurality of microrefractive elements.

3. The resonator of claim 2, wherein said plurality comprises hundreds to millions.

4. The resonator of claim 2, wherein said microrefractive element comprises a microsphere or hemisphere.

5. The resonator of claim 4, wherein the opposing mirrors are separated by a distance of ~20-200 µm.

6. The resonator of claim 5, wherein said microsphere has a diameter of ~10-200 µm.

7. The resonator of claim 4, wherein said microsphere is upon the surface of one of said opposing mirrors.

8. The resonator of claim 4, wherein said microsphere is attached to surface of one of said opposing mirrors via optical adhesive.

9. The resonator of claim 8, wherein said microsphere comprises a plurality of microspheres or hemispheres arranged in a pattern.

10. The resonator of claim 9, wherein said pattern is a hexagonal pattern.

11. The resonator of claim 4, wherein said microsphere comprises a solid microsphere or hemisphere.

12. The resonator of claim 11, wherein said microsphere comprises sapphire, glass, diamond, or an infrared material.

13. The resonator of claim 4, wherein said microsphere comprises liquid or gases inside a solid shell.

14. The resonator of claim 2, wherein said microrefractive element comprises a biological cell.

15. The resonator of claim 14, wherein said biological cell comprises *Chlamydomonas Reinhardtii*.

16. The resonator of claim 14, comprising a resonator volume between said opposing mirrors, said resonator volume being divided into two sections by a window, wherein one of the two sections of the resonator volume contains said gain medium and the other contains a biological solution with a plurality of biological cells.

17. The resonator of claim 1, comprising a resonator volume between said opposing mirrors, said resonator volume being divided into two sections by a window, wherein one of the two sections of the resonator volume contains a first gain medium and the other contains a second gain medium and a plurality of microrefractive elements.

18. The resonator of claim 1, comprising a resonator volume between said opposing mirrors, said resonator volume containing a plurality of microrefractive elements.

19. The resonator of claim 18, wherein said plurality of microrefractive elements are suspended in a liquid or gas.

20. The resonator of claim 1, wherein said gain medium comprises a rare earth doped disk.

21. The resonator of claim 20, wherein said at least one microrefractive element is upon said disk, and said disk is upon one of said opposing mirrors.

22. The resonator of claim 20, further comprising a heat sink to cool the resonator.

23. The resonator of claim 1, comprising a plurality of gain media separated from each other.

24. An imaging system including a resonator of claim 1, the imaging system further including optics to focus a plurality of laser beams from the resonator onto a sample and optics and an image sensor for sensing an image of the sample.

25. A monitoring and feedback system including a resonator of claim 1, the monitoring and feedback system further including optics to divert a portion of the energy of a plurality of laser beams from the resonator onto a detector, a feedback controller and an actuator to move one of opposing mirrors.

26. The monitoring and feedback system of claim 25, wherein said one of said opposing mirrors comprising a plurality of micromirrors.

27. A method for producing laser light, the method comprising:
   directing pump light onto one or a plurality of microrefractive elements;
   with mirrors, confining reflections from the one or a plurality of microrefractive elements in a resonator volume;
   providing gain in the resonator volume; and
   emitting laser energy from the resonator volume.

28. The method of claim 27, comprising a plurality of microrefractive elements, wherein said emitting comprises emitting individual laser energy from each of said plurality of microrefractive elements.

29. The method of claim 28, wherein said emitting comprises emitting a predetermined pattern of individual laser energy based upon a pattern of said plurality of microrefractive elements.

\* \* \* \* \*